United States Patent
Ploke (10) Patent No.: US 11,092,186 B2
(45) Date of Patent: Aug. 17, 2021

(54) PRETENSIONING ELEMENT PRESSURE SCREW AND PRETENSIONING ELEMENT HAVING A PLURALITY OF SUCH PRETENSIONING ELEMENT PRESSURE SCREWS AND PRETENSIONING SCREW BODY ELEMENT HAVING A PLURALITY OF SUCH PRETENSIONING ELEMENT PRESSURE SCREWS

(71) Applicant: PLOKE ENGINEERING AG, Rüeterswil (CH)

(72) Inventor: Robert Ploke, Rüeterswil (CH)

(73) Assignee: PLOKE ENGINEERING AG, Rüeterswil (CH)

( * ) Notice: Subject to any disclaimer, the term of this patent is extended or adjusted under 35 U.S.C. 154(b) by 232 days.

(21) Appl. No.: 16/339,103

(22) PCT Filed: Oct. 3, 2017

(86) PCT No.: PCT/IB2017/056095
§ 371 (c)(1),
(2) Date: Apr. 3, 2019

(87) PCT Pub. No.: WO2018/065898
PCT Pub. Date: Apr. 12, 2018

(65) Prior Publication Data
US 2019/0257345 A1 Aug. 22, 2019

(30) Foreign Application Priority Data
Oct. 3, 2016 (DE) .................. 10 2016 219 131.4

(51) Int. Cl.
*F16B 31/04* (2006.01)
(52) U.S. Cl.
CPC ........... *F16B 31/04* (2013.01); *F16B 31/043* (2013.01)

(58) Field of Classification Search
CPC .... F16B 23/00; F16B 23/003; F16B 23/0061; F16B 31/04; F16B 31/043; F16B 35/005;
(Continued)

(56) References Cited

U.S. PATENT DOCUMENTS

| 4,338,037 A | * | 7/1982 | Deminski | ........... F04B 39/0022 403/24 |
| 4,622,730 A | * | 11/1986 | Steinbock | ............. B21B 27/035 403/320 |

(Continued)

FOREIGN PATENT DOCUMENTS

| DE | 90 16 087.8 | 5/1991 |
| DE | 102 42 102 A1 | 3/2004 |

(Continued)

OTHER PUBLICATIONS

Written Opinion filed in corresponding PCT Application No. PCT/IB2017/056095 dated Jan. 4, 2018.
(Continued)

*Primary Examiner* — Roberta S Delisle
(74) *Attorney, Agent, or Firm* — Finch & Maloney, PLLC; Michael J. Bujold (57) ABSTRACT

A pretensioning element pressure screw (11) having a shank (12) which has a first end (13) and a second end (14), opposite the first end (13). Starting from the first end (13), a threaded portion (16), having an outer diameter (D), is formed adjacent a threadless shank portion (21), having an outer diameter (dg). The threadless shank portion (21) extends to the second end (14) of the shank (12). An engagement mechanism (26) for a tool is arranged at the first end (13) of the shank (12). The outer diameter (dg) of the threadless shank portion (21) corresponds to 1.0 times the outer diameter (D) of the threaded portion (16). A pretensioning element and a pretensioning screw body element (Continued)

having a plurality of such pretensioning element pressure screws (11) is also disclosed.

19 Claims, 4 Drawing Sheets

(58) Field of Classification Search
CPC ............... F16B 35/041; Y10S 411/919; Y10T 403/7041; B25B 29/02
USPC ...... 411/14.5, 378, 393, 402, 403, 405, 411, 411/424, 916
See application file for complete search history.

(56) References Cited

U.S. PATENT DOCUMENTS

| | | | |
|---|---|---|---|
| 4,786,226 A | 11/1988 | Jende | |
| 5,075,950 A | 12/1991 | Steinbock | |
| 6,062,786 A * | 5/2000 | Garver | F16B 35/047 411/386 |
| 6,112,396 A * | 9/2000 | Steinbock | B23P 19/067 29/452 |
| 6,155,761 A * | 12/2000 | Donovan | B21H 3/06 411/386 |
| 6,199,453 B1 * | 3/2001 | Steinbock | B23P 19/068 29/452 |
| 6,263,764 B1 | 7/2001 | Steinbock | |
| 6,381,827 B1 * | 5/2002 | Steinbock | B23P 19/068 29/452 |
| 6,464,440 B1 * | 10/2002 | Steele | F16B 33/06 411/378 |
| 7,188,554 B2 * | 3/2007 | Baynham | A61B 17/8875 411/402 |
| 8,832,921 B2 * | 9/2014 | Marks | F16B 39/12 29/525.02 |
| 9,157,469 B2 * | 10/2015 | Marks | B02C 2/005 |
| 2011/0158766 A1 * | 6/2011 | Mitrovic | F16B 37/122 411/393 |

FOREIGN PATENT DOCUMENTS

| | | |
|---|---|---|
| DE | 10 214 221 732 A1 | 4/2016 |
| EP | 0 206 190 A1 | 12/1986 |
| EP | 1 117 504 B1 | 10/2007 |

OTHER PUBLICATIONS

International Search Report filed in corresponding PCT Application No. PCT/IB2017/056095 dated Jan. 4, 2018.
German Search Report filed in corresponding Italian Application No. 10 2016 219 131.4 dated May 18, 2017.

* cited by examiner

PRETENSIONING ELEMENT PRESSURE SCREW AND PRETENSIONING ELEMENT HAVING A PLURALITY OF SUCH PRETENSIONING ELEMENT PRESSURE SCREWS AND PRETENSIONING SCREW BODY ELEMENT HAVING A PLURALITY OF SUCH PRETENSIONING ELEMENT PRESSURE SCREWS

The invention relates to a pretensioning element pressure screw according to the preamble of claim 1 as well as a pretensioning element with a plurality of such pretensioning element pressure screws according to claim 9 and a pretensioning screw body element with such pretensioning element pressure screws according to claim 14.

Pretensioning elements and pretensioning screw body elements with a plurality of pretensioning element pressure screws, also known as multi-jackbolt tensioners, are used to tighten screws and bolts, especially in industrial applications, it is essential that high pretensioning forces can be generated with the pretensioning element or with the pretensioning screw body element in order to cover a wide range of applications—even under high loads.

A pretensioning element with a nut body, a support disc and a plurality of pretensioning element pressure screws is known from EP 1 117 504 B1, wherein the pretensioning element pressure screws engage with the nut body in circumferentially spaced-apart threaded openings in the nut body.

The pretensioning element pressure screws shown in EP 1 117 504 B1 have a shank with a first end and a second end, which is arranged opposite the first end. Starting from the first end, a threaded portion is provided with an outer diameter and, adjoining to the threaded portion, a threadless shank portion is provided with a smaller outer diameter extending to the second end of the shank. At the first end of the shank there is a tool engagement means.

The disadvantage of the known solution is that the applicable pretensioning forces are limited and therefore the pretensioning element has an application range that is limited to the achievable pretensioning level.

The object of the present invention is thus to create a pretensioning element pressure screw for a pretensioning element as well as a pretensioning element with such pretensioning element pressure screws and a prestressing screw body element with such pretensioning element pressure screws, which does not have the aforementioned disadvantages and can be used in particular for a wide range of applications and also under the most difficult industrial conditions.

The object is solved by the features of independent claims. Advantageous further developments are set out in the figures and in the representative dependent patent claims.

According to a first aspect of the invention, the outer diameter of the threadless shank portion corresponds to 0.95 times to 1.5 times the outer diameter of the thread portion.

A threadless shaft portion with such an outer diameter enables the transfer of high pressure forces via the pressure surface at the free end of the shank portion. A pretensioning element pressure screw in accordance with the invention is inserted into a threaded opening of a pretensioning element with its end having the drive means and is thus present in the pretensioning element in a loss-protected manner. The technical effects, namely the mechanical properties due to the favourable ratio of the pressure force in the pretensioning element pressure screw and the deformation of the same, are surprisingly apparent with the ratios given.

Advantageously the outer diameter of the threadless shank portion corresponds to 1.0 times the outer diameter of the thread portion, which enables a material-saving production of the pretensioning element pressure screw. For example, the raw material for the pretensioning element pressure screw is a rod-shaped semi-finished product, whose outer diameter corresponds to the outer diameter of the thread portion. Now the external thread is cut over the length of the thread portion and the drive means is formed at the first end of the shank.

Preferably the thread on the thread portion is formed as a fine pitch thread, so that a large core diameter remains in the thread portion for high force transfer due to the low thread depth. Compared to a standard thread, a fine pitch thread comprises a narrower thread profile and a smaller thread pitch, but also a smaller thread depth than the same thread.

Advantageously, the thread run-out from the thread portion to the free shank portion comprises an angle of 20° to 45°, so that a simple insertion of the pretensioning element pressure screw into a threaded opening of a pretensioning element and an engagement of the thread portion of the pretensioning element pressure screw into the thread of the thread opening is additionally ensured. The thread run-out comprises an angle of 28° to 32°, which is particularly advantageous.

Preferably the engagement means is formed as a hexagon socket (also called Innentorx®), so that high torques can be applied to the pretensioning element pressure screw, but the tool requires little space to apply it and can easily penetrate into a threaded opening, in particular into a threaded opening in a nut body of a pretensioning element.

In the case of a pretensioning element pressure screw, which comprises a fine pitch thread on the threaded portion, a larger hexagon socket can be selected than in the case of a threaded pin according to the standard, whereby a high torque can still be applied to this pretensioning element pressure screw.

In an alternative based on the invention, the engagement means is formed as a hexagonal head (also called Aussentorx®), so that high torques can be applied to the pretensioning element pressure screw, but the tool requires little space to apply it.

In a further alternative, the engagement means is a hexagon screw head, which is advantageously formed in accordance with ISO 4017 or DIN 933. This means that high torques can be applied to the pretensioning element pressure screw using tools that are widely used by users. In addition to the aforementioned engagement means, other alternative engagement means are, for example, internal hexagon, internal or external multiple-toothed XZN (Triple Square), spline drive, Torx-variants (e.g. Torx-Plus, Torx TR) or the like, which may also be advantageous depending on the application.

The outer diameter of the hexagonal head corresponds advantageously to 0.85 times to 0.95 times the outer diameter of the threaded portion, so that the pretensioning element pressure screw can, for example, be completely recessed in a threaded opening of a pretensioning element.

The outer diameter of the threadless shank portion is preferably curved to 0.1 mm, which ensures simple manufacture of the pretensioning element pressure screw and also makes quality testing easy to follow.

Preferably, the length of the threaded portion corresponds to 1.0 times to 3.0 times the outer diameter of the threaded portion, which provides sufficient engagement of the pretensioning element pressure screw to transfer the tensioning forces between the pretensioning element pressure screw and, for example, a nut body of a pretensioning element.

The length of the threaded portion corresponds advantageously to 1.4 times to 1.7 times the outer diameter of the threaded portion, which means that a tensioning path is available which is normally used in practice and the overall height of the nut body and thus of the entire pretensioning element can be kept small.

Preferably, the length of the threaded portion of a hexagon socket as an engagement means corresponds to 1.5 times to 2.5 times the outer diameter of the threaded portion, thus enabling optimum design of a pretensioning element or a pretensioning screw body element for such an engagement means.

A length of the threaded portion corresponding to 1.9 times to 2.1 times the outer diameter of the threaded portion has proved to be particularly advantageous in the case of a hexagonal socket as an engagement means.

Preferably, the length of the threaded portion corresponds to 2.5 times to 3.0 times the outer diameter of the threaded portion of a hexagonal head as an engagement means, thus enabling optimum design of a pretensioning element or a pretensioning screw body element in the case of such an engagement means.

A length of the threaded portion corresponding to 2.7 times to 2.9 times the outer diameter of the threaded portion has proved to be particularly advantageous in the case of a hexagonal head as an engagement means.

Preferably the second end of the shank comprises a convex design so that a reduced bearing surface is created at the free end of the threadless shank portion or at the second end of the shank, when the pretensioning element pressure screw is supported, e.g. on a support disc of a pretensioning element or a support body. This makes it easy to compensate for tolerances between elements of the pretensioning element and improves pressure distribution under load. In addition, this prevents or at least significantly reduces the risk of the second end of the shank expanding under load. The convex design of the second end of the shank also ensures an aligned transfer of force into a support disc or into a support body, even if its contact surface is slightly angled to the direction of pressure force.

Advantageous herein is the convex design of the free end of the threadless shank portion in the shape of a spherical portion. A further advantage of this spherical portion-shaped design of the free end of the threadless shank portion is the spherical radius, which corresponds to 10 times to 18 times the outer diameter of the threaded portion, so that the contact surface is optimally designed for transmitting the pressure forces and for tolerance compensation. The spherical radius of this spherical portion-shaped design corresponds particularly advantageously to 13 to 16 times the outer diameter of the threaded portion.

According to a further aspect of the invention, a pretensioning element comprises a nut body and a plurality of or at least two pretensioning element pressure screws, which are engaged in circumferentially spaced-apart threaded openings of the nut body. The at least two pretensioning element pressure screws of the pretensioning element each have at least individual features of the previously described, inventive pretensioning element pressure screw.

With such a pretensioning element, large tensioning forces can be applied and the applicable load range of the same increases accordingly. A geometric positioning of the pretensioning element pressure screws closer to the centre of the nut body than with the known solutions is also possible with the pretensioning element pressure screws mentioned above. Accordingly, the torque stresses to be absorbed by the pretensioning element are lower than with the known solutions, even at high tensioning forces. A pretensioning element according to the invention can thus be manufactured in smaller dimensions than before. This increases the range of application of the pretensioning element and the manufacturing costs can be reduced compared to the known solutions, in particular due to the greater force which can be applied to the pretensioning element pressure screws according to the invention. In addition, the prestressing element pressure screws are arranged in the nut body so that they cannot be lost.

In this context, the term "nut body" also includes other designs such as screw bodies, ring bodies without internal thread, which can also be multi-part designed, in particular two-part designed.

Preferably, each threaded opening comprises an internal threaded portion with a length, the length of the internal threaded portion corresponds to 1.3 times to 2.5 times the length of the threaded portion of the pretensioning element pressure screw. With such a length of the internal thread portion, a large tensioning path is available.

Advantageously, the length of the internal threaded portion corresponds to 1.5 times the length of the threaded portion of the pretensioning element pressure screw, which provides sufficient tensioning path and allows the pretensioning element pressure screw to be arranged or transferred to a tensioned state with little time requirement.

Preferably, each threaded opening comprises a threadless countersink in which the threadless shank portion of the pretensioning element pressure screw can at least partially immerse into the nut body of the pretensioning element.

The length of the threadless countersink corresponds advantageously to 0.8 times to 1.1 times the length of the threadless shank portion of the pretensioning element pressure screw. If the length of the threadless countersink is equal to or greater than the length of the threadless shank portion of the pretensioning element pressure screw, the threadless shank portion can be completely recessed in the nut body of the pretensioning element.

Preferably the pretensioning element further comprises a support disc of which the second ends of the plurality of pretensioning element pressure screws come into contact at least during tensioning of the same. The support disc is advantageously strong enough that the forces transmitted by the pretensioning element pressure screw can be completely absorbed by it. The pressure forces generated by the pretensioning element pressure screws are transmitted flatly to the surface of the substrate or the support body on which the pretensioning element pressure screws would be supported during the tensioning process by the pressure forces generated by the pretensioning element pressure screws of the support disc.

Preferably, the nut body comprises a receiving opening which is provided with at least one rotation on at least one pressure side of the nut body, thus reducing or preventing stress peaks in this area.

Advantageously, the at least one rotation comprises an angle in the range of 35° to 50°, which in particular frees the highly loaded thread rotations of the threaded portions from deformations and achieves a more even application of force. An angle in the range of 40° to 45° has proven to be particularly advantageous for at least one rotation.

According to a further aspect of the invention, a pretensioning screw body element comprises a screw body shank, a screw body head at one end of the screw body shank, and a plurality or at least two pretensioning element pressure screws which engage in circumferentially spaced-apart threaded openings in the screw body head. The at least two pretensioning element pressure screws of the pretensioning element each have at least individual features of the previously described, inventive pretensioning element pressure screw.

With such a pretensioning screw body element, large tensioning forces can be applied and the applicable load range of the same increases accordingly. A geometric positioning of the pretensioning element pressure screws closer to the centre or longitudinal axis of the screw body than with the known solutions is also possible with the pretensioning element pressure screws mentioned above. Accordingly, the torque stresses to be absorbed by the pretensioning screw body element are lower compared to the known solutions, even at high tensile forces. A pretensioning screw body element according to the invention can thus be manufactured in smaller dimensions than before. This increases the range of application of the pretensioning screw body element and the manufacturing costs can be reduced compared to the known solutions, in particular due to the greater force which can be applied to the pretensioning element pressure screws according to the invention. In addition, the pretensioning element pressure screws are arranged in the screw body head of the pretensioning screw body element so that they cannot be lost.

Preferably, each threaded opening comprises an internal threaded portion with a length, the length of the internal threaded portion corresponds to 1.3 times to 2.5 times the length of the threaded portion of the pretensioning element pressure screw. With such a length of the internal thread portion, a large tensioning path is available.

Advantageously, the length of the internal thread portion corresponds to 1.5 times the length of the threaded portion of the pretensioning element pressure screw, which provides sufficient tensioning path and allows the pretensioning element pressure screw to be arranged or transferred to a tensioned state with little time requirement.

Preferably each threaded opening has a threadless countersink in which the threadless shank portion of the pretensioning element pressure screw can at least partially penetrate into the screw body head of the pretensioning element.

The length of the threadless countersink corresponds advantageously to 0.8 times to 1.1 times the length of the threadless shank portion of the pretensioning element pressure screw. If the length of the threadless countersink is equal to or greater than the length of the threadless shank portion of the pretensioning element pressure screw, the threadless shank portion can be completely recessed in the screw body head of the pretensioning element.

Preferably the pretensioning screw body element further comprises a support disc of which the second ends of the plurality of pretensioning element pressure screws come into contact at least during tensioning of the same. The support disc has the advantage of sufficient strength so that the forces transmitted by the pretensioning element pressure screws can be completely absorbed by them. The compressive forces generated by the pretensioning element pressure screws are transmitted flatly to the surface of the substrate or of the support body on which the pretensioning element pressure screws would be supported during tensioning by the support disc.

Further advantages, features and details of the invention are obtained from the following description in which exemplary embodiments of the invention are described with reference to the drawings.

The reference list and the technical content of the patent claims and figures are part of the disclosure. The figures are described cohesive and overlapping manner. Identical references mean identical components.

Figure 1:
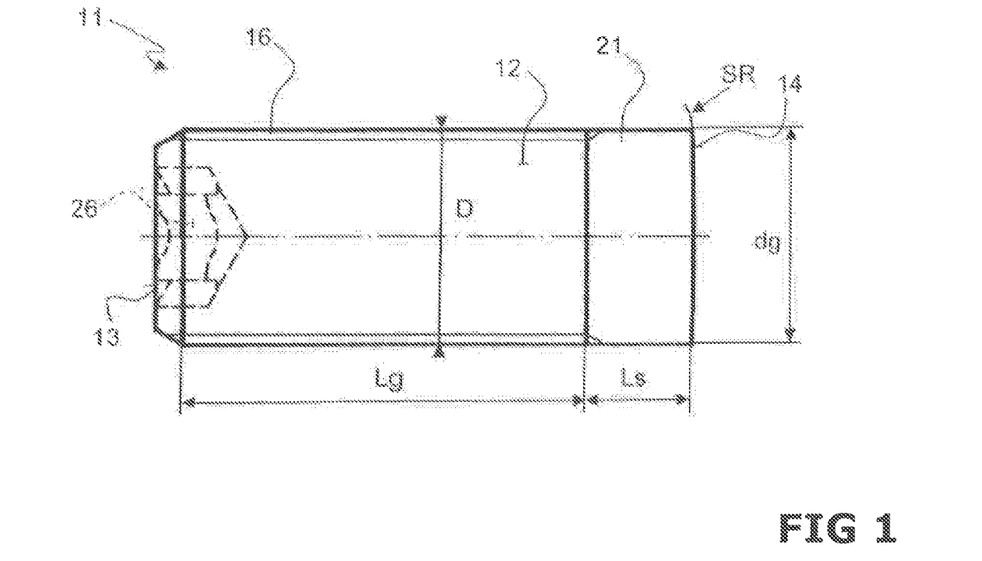
FIG. 1 a first pretensioning element pressure screw according to the invention in a side view, FIG. 2 a further pretensioning element pressure screw according to the invention in a side view, FIG. 3 supervision of a first pretensioning element according to the invention, FIG. 4 the pretensioning element according to FIG. 3 in a cross-sectional view, FIG. 5 supervision of a further pretensioning element in accordance with the invention, FIG. 6 the pretensioning element according to FIG. 5 in a cross-sectional view, FIG. 7 a pretensioning screw body element according to the invention in supervision, and FIG. 8 the pretensioning screw body element according to FIG. 7 in a side view.

The pretensioning element pressure screw 11 for a pretensioning element shown in FIG. 1 comprises a shank 12 with a first end 13 and a second end 14. At the first end 13 of shank 12 there is an engagement means 26 for attaching a tool. The engagement means 26 is a hexagon socket, e.g. an Innentorx®.

The shank 12 comprises a threaded portion 16 with an outer diameter D starting from its first end 13. The thread on the threaded portion 16 is designed as a fine pitch thread M12×1.5 with a pitch of 1.5.

Adjoint to the threaded portion 16 is a threadless shank portion 21 with an outer diameter dg extending to the second end 14 of the shank 12. The outer diameter dg of the threadless shank section 21 is equal to 1.0 times the outer diameter D of the thread portion 16. The outer diameter dg of the threadless shank portion 21 is curved to 0.1 mm.

The length Lg of the threaded portion 16 corresponds to 1.0 times to 3.0 times the outer diameter D of the threaded portion 16, advantageously 1.5 times to 2.5 times the outer diameter D of the threaded portion 16. In this example the length Lg of the threaded portion 16 corresponds to 2.0 times the outer diameter D of the thread portion 16.

The length Ls of the threadless shank section 21 is selected according to the design of the pretensioning element and can vary accordingly. The maximum length Ls of the threadless shank section 21 is essentially limited only by any buckling under load. In the case of the pretensioning element pressure screw 11, the length Ls of the threadless shank portion 21 corresponds to 0.5 times the outer diameter D of the thread portion 16.

The second end 14 of the shank 12 or the free end of the threadless shank portion 21 has a convex design or shape. In this example, the convex design is spherical, with the spherical radius SR of the spherical portion corresponding to 15 times the outer diameter D of the threaded portion 16. The spherical radius SR is in the range of 10 times to 18 times, advantageously 13 to 16 times, the outer diameter D of the thread portion 16.

Figure 2:
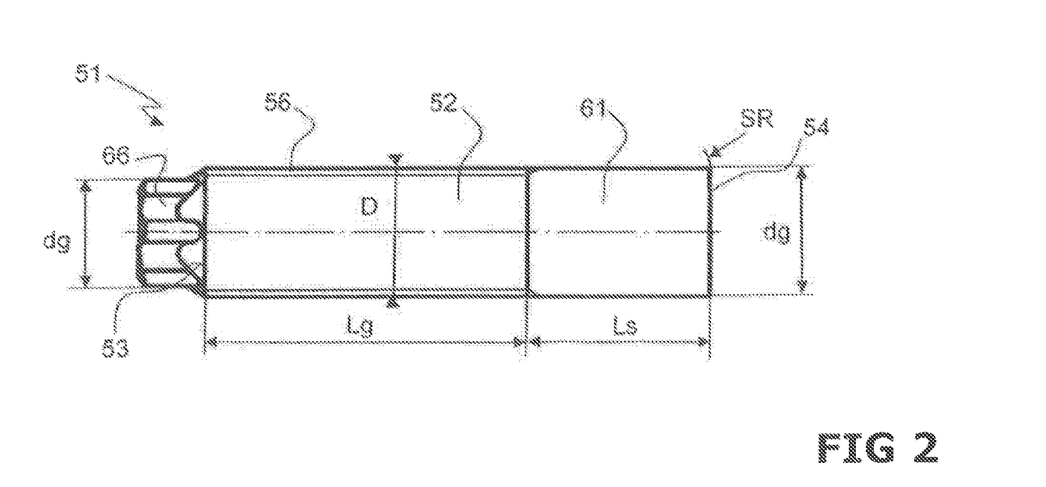

In contrast to the pretensioning element pressure screw 11, the pretensioning element pressure screw 51 shown in FIG. 2 shows at the first end 53 of the shank 52 an engagement means 66 for a tool which is designed as a hexagonal head, e.g. an Aussentorx®. The outer diameter dq of the outer diameter dq hexagonal head corresponds advantageously to 0.85 times to 0.95 times the outer diameter D of the threaded portion 56. In this example, the outer diameter dq of the hexagonal head corresponds to 0.92 times the outer diameter D of the thread portion 56.

The thread on the threaded portion 56 is designed as a fine pitch thread M10×1.25 and thus has a pitch of 1.25.

The threadless shank portion 61 extending from the threaded portion 56 to the second end 54 of the shank 22 has an outer diameter dg equal to 1.05 times the outer diameter D of the threaded portion 56.

In this embodiment, the length Lg of the threaded portion 56 corresponds to 2.5 times to 3.0 times, advantageously 2.7 times to 2.9 times, the outer diameter D of the threaded portion 56. In this example, the length Lg of the threaded portion 56 corresponds to 2.8 times the outer diameter D of the threaded portion 56. The length Ls of the threadless shank portion 61 corresponds here to 1.6 times the outer diameter D of the thread portion 56.

The second end 54 of the shank 52 or the free end of the threadless shank portion 61 also has a convex or cambered design.

Figure 3:
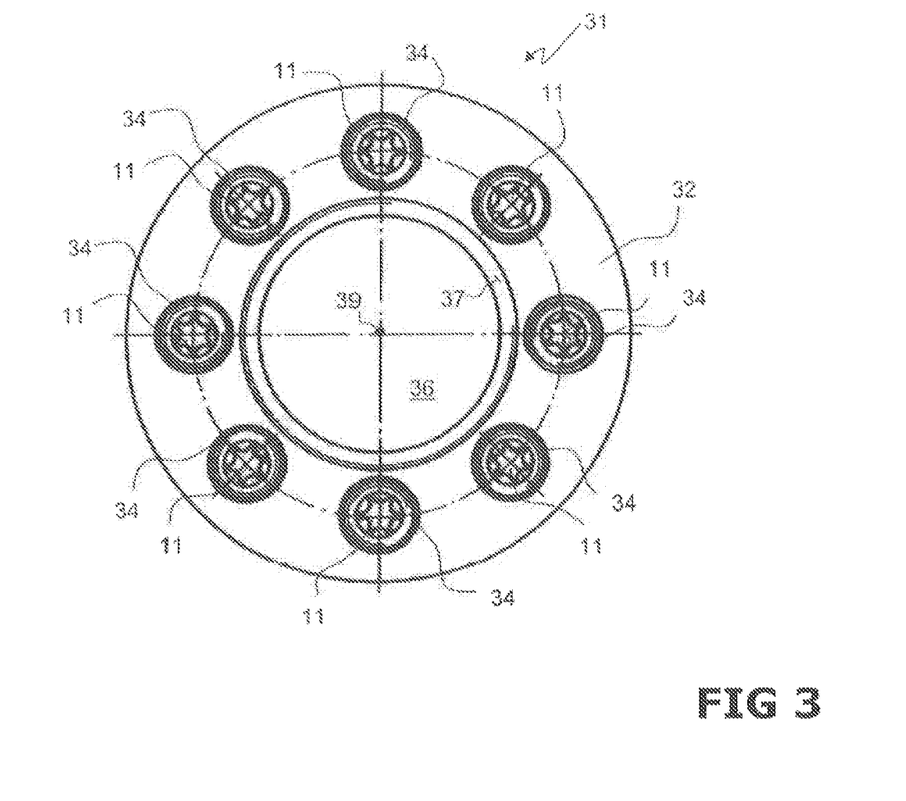
Figure 4:
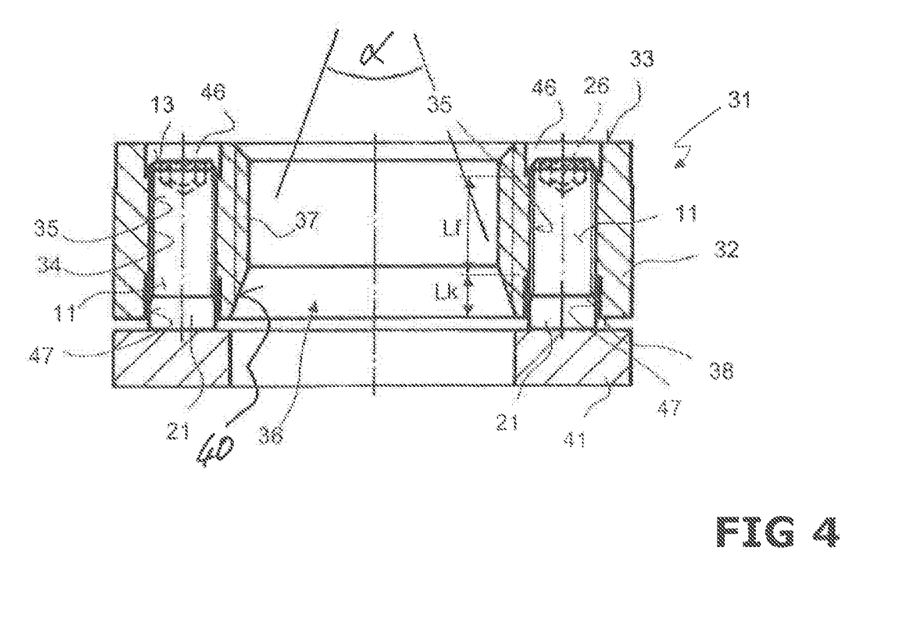

The pretensioning element 31 shown in FIGS. 3 and 4 comprises a ring-shaped nut body 32, a ring-shaped support disc 41 as well as a plurality of pretensioning element pressure screws 11—eight in this example—a plurality of threaded openings 34 spaced-apart from each other are provided in the nut body 32, corresponding to eight in this example. At a distance from the free side 33 of the nut body 32, each threaded opening 34 is provided with an internal thread portion 35, which, however, does not extend over the entire length of the threaded opening 34. The length Lf of the threaded portion 35 in this example corresponds to 1.5 times the length Lg of the threaded portion 16 of the pretensioning element pressure screw 11. The corresponding pretensioning element pressure screw 11 engages with its threaded portion 16 in the internal thread portion 35.

Starting from the free side 33 of the nut body 32, an undercut opening 46 extends into which a tool can be inserted for engagement/attachment with the engagement means 26 of the prestressing element pressure screw 11. The pretensioning element pressure screw 11 can be recessed in the nut body 32 in such a way that its first ends 13 do not project beyond the free side 33 of the nut body 32.

On the pressure side 38 of the nut body 32, which is opposite the free side 33 of the nut body 32, each threaded opening 34 has a threadless countersink 47. The length Lk of the threadless countersink 47 here corresponds to 0.9 times the length of the threadless shank portion 21 of the pretensioning element pressure screw 11.

The pretensioning element pressure screw 11, for example, is screwed into the threaded opening 34 from the pressure-side side 38 with the drive means/engagement means 26 first when assembling, advantageously until the threadless shank portion 21 penetrates into the countersink 47 of the threaded opening 34. The pretensioning element pressure screws 11 are arranged in the pretensioning element 31 so that they cannot be lost.

Furthermore, the nut body 32 has a receiving opening 36 for receiving the bolt to be clamped (not shown here). An internal thread 37 is provided on the inside of the receiving opening 36 in order to arrange the nut body 32 on the bolt provided with a corresponding external thread and to tighten it by means of the pretensioning element pressure screws 11. The receiving opening 36 is provided on the pressure side 38 of the nut body 32 with a rotation 40, which in this example includes an angle α of 40°.

The corresponding pretensioning element pressure screws 11 is screwed into the nut body 32 by means of a tool placed on the engagement means 26 of the pretensioning element pressure screw 11 (not shown here). Since the second end 14 of the shank 12 of the pretensioning element pressure screw 11 is supported on the support disc 41, the nut body 32 and the bolts connected to it are lifted axially in the direction of the pretensioning force relative to the support disc 41 and thus the bolt is tensioned by the elongation of the latter.

Due to its design, the pretensioning element pressure screw 11 can be arranged in the nut body 32 near its centre 39, which significantly reduces the risk of the nut body 32 tilting when the pretensioning element 31 is tightened. In addition, high pressure forces can be transmitted via these pretensioning element pressure screws 11 and therefore large tensioning forces can be generated with pretensioning elements compared to the known solutions.

In this embodiment, the threaded openings 34 in the nut body 32 are arranged at the same distance from the centre 39 of the nut body 32. However, it is conceivable to provide these threaded openings 34 in the nut body 32 at different distances from the centre 39 of the nut body 32, advantageously alternating. Furthermore, the threaded openings 34 can also be provided at two or more distances from the centre 39 of the nut body 32, so that a multi-row arrangement of the same is given.

In this embodiment, the threaded openings 34 are each provided at an even distance from each other in the nut body 32, which is particularly advantageous for uniform tensioning. Alternatively, the threaded openings 34 in a nut body 32 have at least partially irregular distances from each other so that, for example, special tensioning conditions can be generated with the corresponding pretensioning element or areas in which no pressure forces may be applied can be taken into account.

In this embodiment, all pretensioning element pressure screws 11 have the same design. However, it is also conceivable to provide at least two different types of pretensioning element pressure screws, for example in order to apply a first specific pretensioning force in a first step via the first type of pretensioning element pressure screws and then to apply a further specific pretensioning force different from the first specific pretensioning force via the at least one second type of pretensioning element pressure screws in a further first step.

Figure 5:
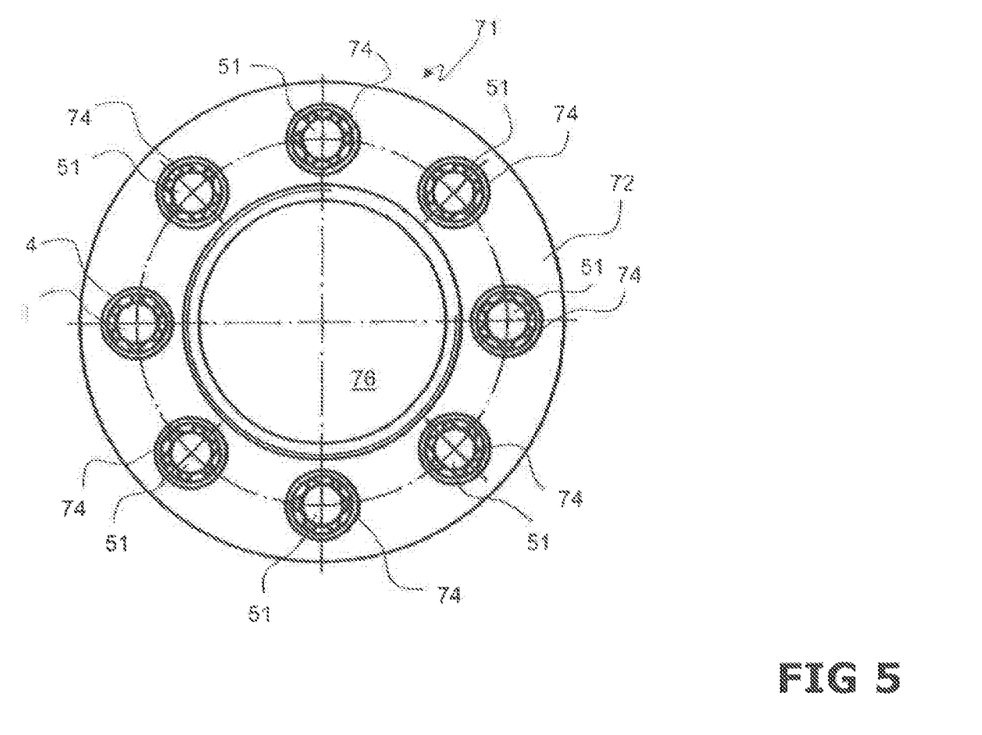
Figure 6:
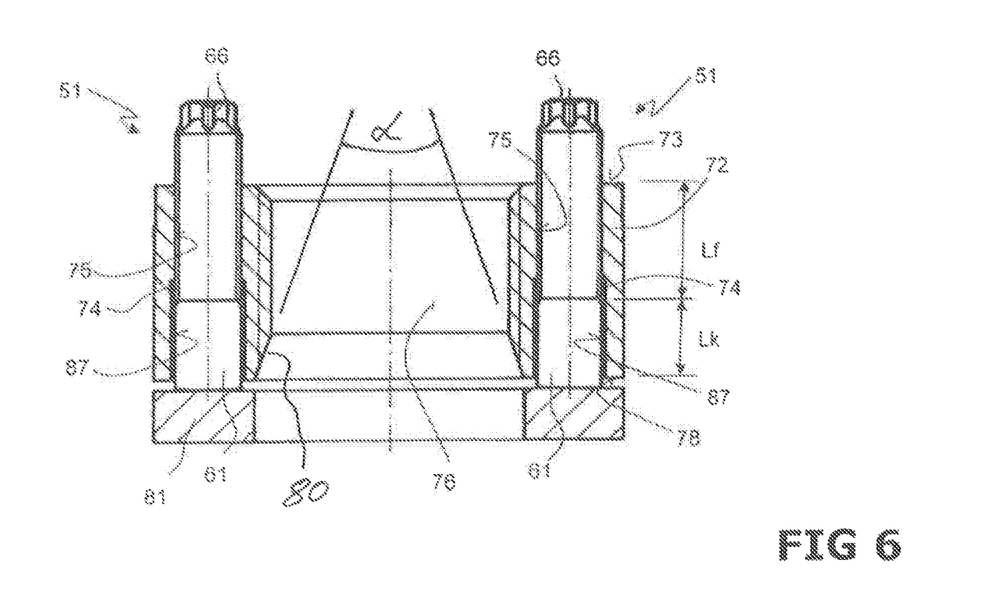

FIGS. 5 and 6 show a pretensioning element 71 which differs from the pretensioning element 31 described above essentially in the design of the nut body 72 and the pretensioning element pressure screw 51.

The plurality of—in this example eight—pretensioning element pressure screws 51 are provided in circumferentially distributed, spaced-apart threaded openings 74. Starting from the free side 73 of nut body 72, each thread opening 74 is provided with an internal thread portion 75. The internal thread portion 75 extends over a length Lf, which in this design example corresponds to 1.5 times the length Lg of the threaded portion 56 of the pretensioning element pressure screw 51.

On the pressure side 78 of the nut body 72, which is opposite the free side 73 of the nut body 72, each threaded opening 74 has a threadless countersink 87. The length Lk of the threadless countersink 87 here corresponds to 1.05 times the length of the threadless shaft section 61 of the pretensioning element pressure screw 51.

The pretensioning element pressure screws 51 are, for example, screwed into the threaded opening 74 from the pressure-side side 78 with the drive means 66 first during assembly, advantageously until the threadless shank portion 61 penetrates into the counterboring 87 of the threaded opening 74. The pretensioning element pressure screws 51 are arranged in the pretensioning element 71 so that they cannot be lost.

The receiving opening 76 is provided on the pressure side 78 of the nut body 72 with a rotation 80, which in this example includes an angle α of 40°.

Figure 7:
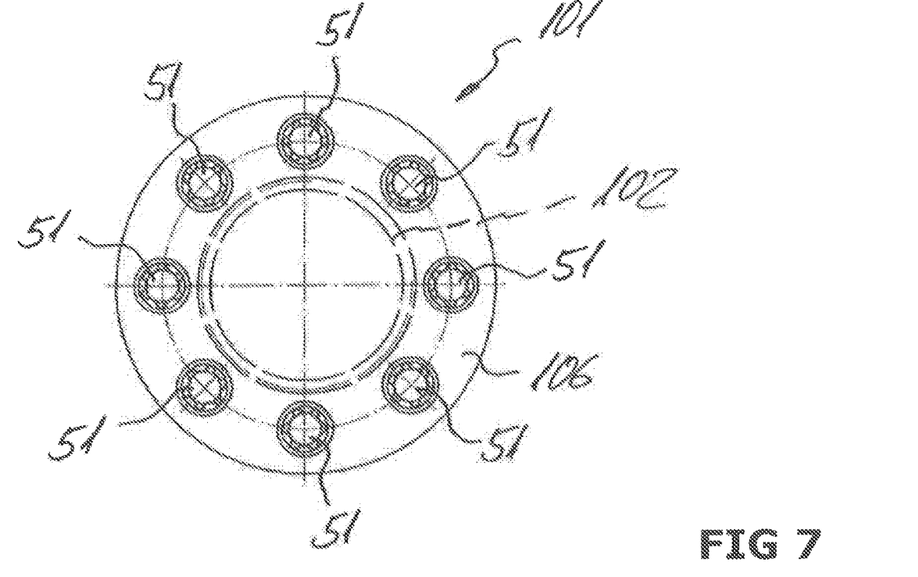
Figure 8:
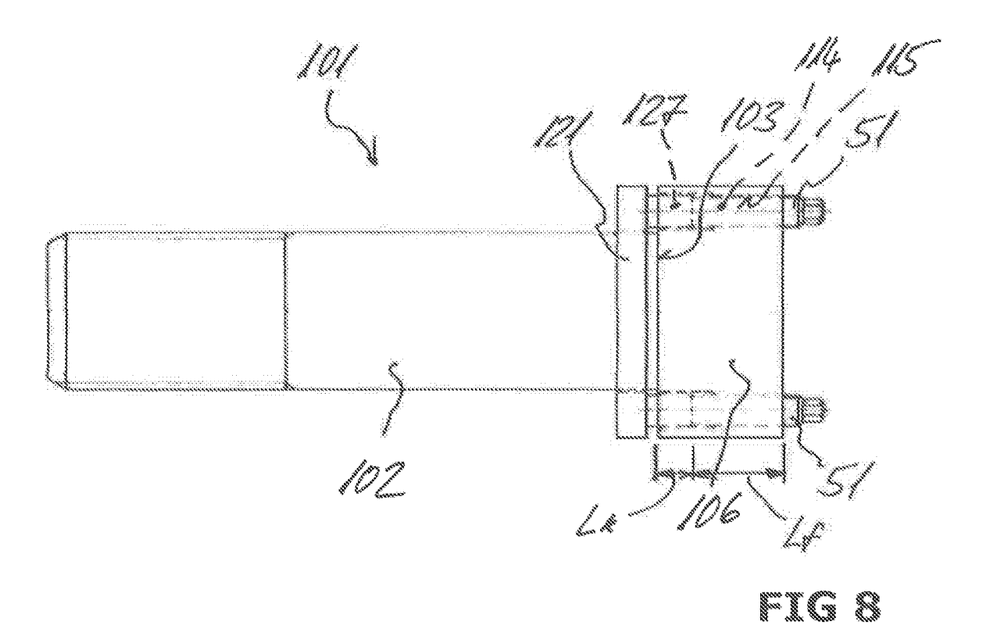

FIGS. 7 and 8 show a pretensioning screw body element 101. The pretensioning screw body element 101 has one screw body 102 and one screw body head 106 at one end 103 of the screw body 102 and a plurality of pretensioning element pressure screws 51, here eight, which are engaged with the screw body head 106 in circumferentially spaced threaded openings 114 in the screw body head 106.

Each threaded opening 114 has an internal thread portion 115 with a length Lf and a threadless counterbore 127 with a length Lk.

The pretensioning screw body element 101 also includes a support disc 121 with which the second ends 54 of the several pretensioning element pressure screws 51 come into contact at least when they are tightened.

REFERENCES

| 11 | pretensioning element pressure screw | 51 | pretensioning element pressure screw |
|---|---|---|---|
| 12 | shank | 52 | shank |
| 13 | 1. end of 12 | 53 | 1. end of 52 |
| 14 | 2. end of 12 | 54 | 2. end of 52 |
| 16 | threaded portion | 56 | threaded portion |
| 21 | threadless shank section | 61 | threadless shank section |
| 26 | engagement means I | 66 | engagement means |
| 31 | pretensioning element | 71 | pretensioning element |
| 32 | nut body | 72 | nut body |
| 33 | free side of 32 | 73 | free side of 72 |
| 34 | threaded opening | 74 | threaded opening |
| 35 | internal thread portion of 34 | 75 | internal thread portion of 74 |
| 36 | receiving opening | 76 | receiving opening |
| 38 | pressure side of 32 | 78 | pressure side of 72 |
| 39 | centre of 32 | 80 | rotation |
| 40 | rotation | 81 | support disc |
| 41 | support disc | 87 | countersink |
| 46 | undercut opening | Lf | length of 35/75 |
| 47 | countersink | Lk | length of 47/87 |
| D | outer diameter of 16/56 | dq | outer diameter of 66 |
| Lg | length of 16/56 | SR | spherical radius. 14 |
| dg | outer diameter of 21/61 | | |
| Ls | length of 21/61 | | |
| a | angle in the range 40 or 80 | | |
| 101 | pretensioning screw body element | | |
| 102 | screw body shank | | |
| 103 | 1. end of 102 | | |
| 106 | screw body head | | |
| 114 | threaded opening | | |
| 115 | internal thread portion of 34 | | |
| 121 | support disc | | |
| 127 | countersink | | |

The invention claimed is:

1. A loss-protective pretensioning element pressure screw having a shank which has a first end and a second end which is arranged opposite the first end, whereby starting from the first end a threaded portion having an outer diameter (D) and a threadless shank portion adjoining the threaded portion with an outer diameter (dg) is provided, which extends to the second end of the shank and with an engagement means for a tool, which is provided at the first end of the shank,
    wherein the outer diameter (dg) of the threadless shank portion corresponds to 0.95 times to 1.5 times the outer diameter (D) of the threaded portion.

2. The loss-protective pretensioning element pressure screw according to claim 1, wherein the thread at the thread portion is formed as a fine pitch thread.

3. The loss-protective pretensioning element pressure screw according to claim 1, wherein the engagement means is formed as an hexagonal socket or the engagement means is formed as a hexagonal head, whereby the outer diameter of the hexagonal head corresponds to 0.85 times to 0.95 times the outer diameter (D) of the threaded portion.

4. The loss-protective pretensioning element pressure screw according to claim 1, wherein the outer diameter (dg) of the threadless shank portion is curved to 0.1 mm.

5. The loss-protective pretensioning element pressure screw according to claim 1, wherein the length (Lg) of the threaded portion corresponds to 1.0 times to 3.0 times the outer diameter (D) of the threaded portion.

6. The loss-protective pretensioning element pressure screw according to claim 5, wherein the length (Lg) of the threaded portion of a hexagon socket as an engagement means corresponds to 1.5 times to 2.5 times the outer diameter (D) of the threaded portion.

7. The loss-protective pretensioning element pressure screw according to claim 5, wherein the length (Lg) of the threaded portion of a hexagonal head as an engagement means corresponds to 2.5 times to 3.0 times the outer diameter (D) of the threaded portion.

8. The loss-protective pretensioning element pressure screw according to claim 1, wherein the second end of the shank comprises a convex design, the convex design comprises the shape of a spherical portion and further comprises a spherical radius (SR) which corresponds to 10 times to 18 times the outer diameter (D) of the threaded portion.

9. The loss-protective pretensioning element pressure screw according to claim 1, wherein the second end of the shank comprises a convex design, and the convex design comprises the shape of a spherical portion.

10. The loss-protective pretensioning element pressure screw according to claim 1, wherein the second end of the shank comprises a convex design, and the convex design comprises the shape of a spherical portion and further comprises a spherical radius (SR) which corresponds to 10 times to 18 times the outer diameter (D) of the threaded portion.

11. A pretensioning element comprising a nut body and a plurality of loss-protective pretensioning element pressure screws which are engaged in circumferentially spaced-apart threaded openings of the nut body,
    wherein the loss-protective pretensioning element pressure screws each have a shank which has a first end and a second end which is arranged opposite the first end, whereby starting from the first end a threaded portion having an outer diameter (D) and a threadless shank portion adjoining the threaded portion with an outer diameter (dg) is provided, which extends to the second end of the shank, and with an engagement means for a tool, which is provided at the first end of the shank,
    wherein the outer diameter (dg) of the threadless shank portion corresponds to 0.95 times to 1.5 times the outer diameter (D) of the threaded portion.

12. The pretensioning element according to claim 11, wherein each threaded opening comprises an internal threaded portion with a length (Lf), and the length (Lf) of the internal threaded portion corresponds to 1.3 times to 2.5 times the length (Lg) of the threaded portion of the loss-protective pretensioning element pressure screw.

13. The pretensioning element according to claim 11, wherein each threaded opening comprises a threadless countersink, and the length (Lk) of the threadless countersink corresponds to advantageously 0.8 times to 1.1 times the length (Ls) of the threadless shank portion of the loss-protective pretensioning element pressure screw.

14. The pretensioning element according to claim 11, wherein the pretensioning element further comprises a support disc, of which the second ends of the plurality of loss-protective pretensioning element pressure screws come into contact at least during tensioning of the same.

15. The pretensioning element according to claim 11, wherein the nut body comprises a receiving opening, which is provided with at least one rotation on at least one pressure side of the nut body, and the rotation advantageously comprises an angle ($\alpha$) in the range of 35° to 50°.

16. A pretensioning screw body element comprises a screw body shank, a screw body head at one end of the screw body shank, and a plurality or at least two loss-protective pretensioning element pressure screws, which engage in circumferentially spaced-apart threaded openings in the screw body head, wherein the loss-protective pretensioning element pressure screws each have a shank which has a first end and a second end which is arranged opposite the first end, whereby starting from the first end a threaded portion having an outer diameter (D) and a threadless shank portion adjoining the threaded portion with an outer diameter (dg) is provided, which extends to the second end of the shank, and with an engagement means for a tool, which is provided at the first end of the shank,
    wherein the outer diameter (dg) of the threadless shank portion corresponds to 0.95 times to 1.5 times the outer diameter (D) of the threaded portion.

17. The pretensioning screw body element according to claim 16, wherein each threaded opening comprises an internal thread portion having a length (Lf), whereby the length (Lf) of the internal threaded portion corresponds to 1.3 times to 2.5 times the length (Lg) of the threaded portion of the loss-protective pretensioning element pressure screw.

18. The pretensioning screw body element according to claim 16, wherein each threaded opening comprises a threadless countersink, wherein the length (Lk) of the threadless countersink corresponds to advantageously 0.8 times to 1.1 times the length (Ls) of the threadless shank portion of the loss-protective pretensioning element pressure screw.

19. The pretensioning screw body element according to claim 16, wherein the pretensioning screw body element further comprises a support disc, of which the second ends of the plurality of loss-protective pretensioning element pressure screws come into contact at least during tensioning of the same.

\* \* \* \* \*